United States Patent [19]

Allen

[11] Patent Number: 5,465,890

[45] Date of Patent: Nov. 14, 1995

[54] AUTOMOTIVE VEHICLE RACK MAST HOLDER

[75] Inventor: Scott R. Allen, Yuba City, Calif.

[73] Assignee: Mascotech Accessories, Inc., Port Huron, Mich.

[21] Appl. No.: 145,985

[22] Filed: Oct. 28, 1993

[51] Int. Cl.⁶ .................................................. B60R 9/00
[52] U.S. Cl. ...................... 224/324; 224/309; 224/318
[58] Field of Search .................................... 224/324, 309, 224/315, 318, 320, 321, 327, 330, 331

[56] References Cited

U.S. PATENT DOCUMENTS

| | | | |
|---|---|---|---|
| 4,226,351 | 10/1980 | Biermann et al. | 224/323 |
| 4,817,838 | 4/1989 | Kamaya | 224/324 |
| 5,067,644 | 11/1991 | Coleman | 224/318 |
| 5,316,192 | 5/1994 | Ng | 224/324 |

FOREIGN PATENT DOCUMENTS 153865  2/1982  Germany ................ 224/315

*Primary Examiner*—Henry J. Recla
*Assistant Examiner*—David J. Wekzak
*Attorney, Agent, or Firm*—Flehr, Hohbach, Test, Albritton & Herbert

[57] ABSTRACT

A mast holder for a roof rack is described. Such mast holder includes three flexible straps which interact to provide reliable securance to a rack cross bar. It also includes a cradle having a rest of a configuration which conforms to the exterior shape of a mast. The cradle is of a material which is sufficiently pliable to provide such conformation. The cradle is also formed with support structure for the rest by coextrusion. The support structure is configured to interact with the rest to provide the necessary structural support that it needs.

17 Claims, 2 Drawing Sheets

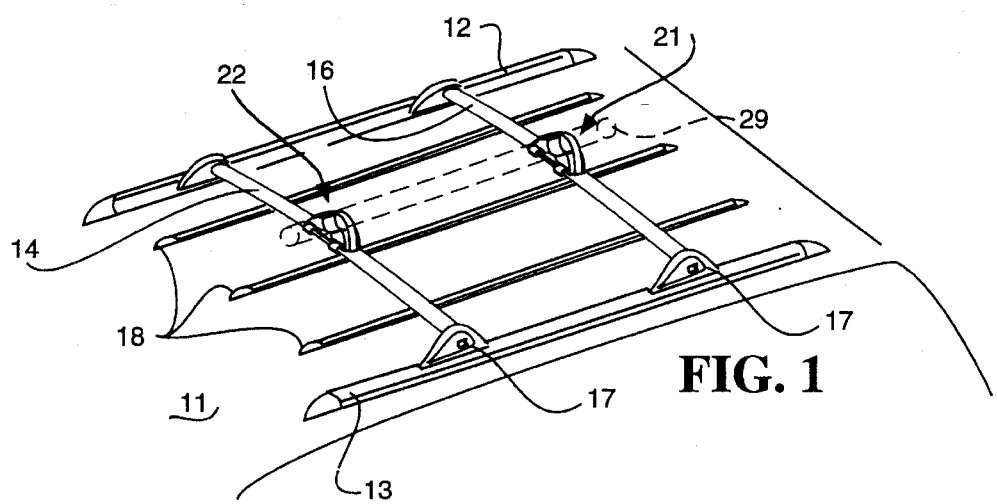
FIG. 1
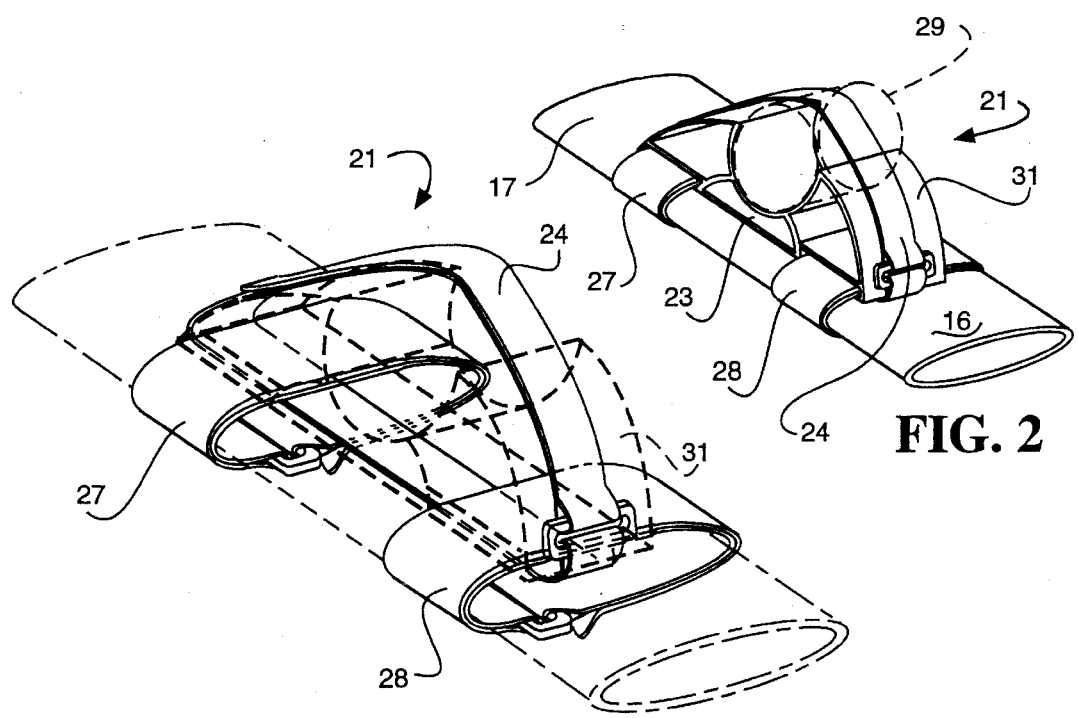
FIG. 2
FIG. 3
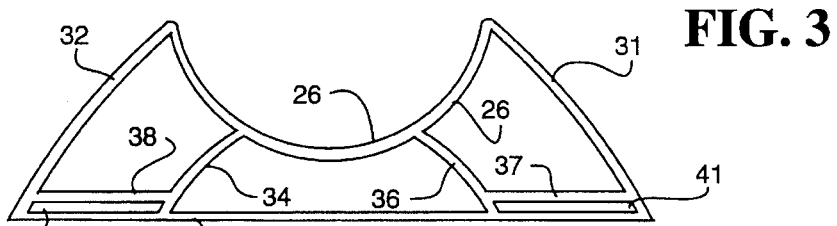
FIG. 4
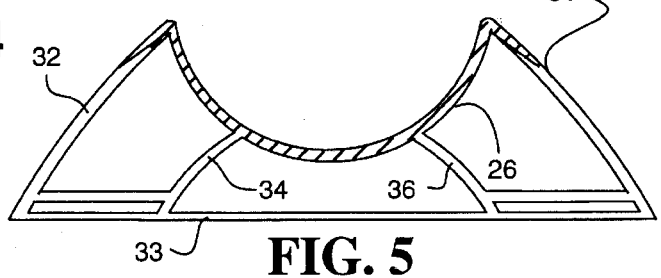
FIG. 5

5,465,890

1

AUTOMOTIVE VEHICLE RACK MAST HOLDER

BACKGROUND OF THE INVENTION

The present invention relates to automotive vehicle racks and, more particularly, to a holder for securing an elongated object to an automotive vehicle rack.

It is desirable to be able to carry masts for sailboards or boats on a roof rack of a vehicle. It is important, though, that the rack holding arrangement not result in damage to the surface of the mast. Moreover, although most, if not all, masts are quite tensile and compressively strong axially thereof, some cannot withstand significant compressive load laterally of the axis, particularly if the load is concentrated.

The rack holders now commercially available for masts typically are designed also to hold various other kinds of items, each of which has its own shape. The shape of the cradle of such holders therefore is also generally universal, and most a holder do not prevent masts or other elongated loads from slightly shifting or vibrating during transportation. Moreover, holders typically are designed to be tough to protect a load from external shocks and forces. Most also rely on the structural integrity of the cradle to provide securance to a rack cross bar. These factors have restricted the material which can be used for a cradle to only ones the designer believes have the structural integrity needed both to absorb the shocks typically associated with transportation and to provide reliable securance to a rack.

SUMMARY OF THE INVENTION

The present invention relates to a holder for reliably securing a mast or other similar article to an automotive vehicle rack without relying on the structural integrity of the cradle. It is from the conceptual (and in some embodiments the actual) standpoint, a two-part holder. The cradle for the mast is separated from the structure which secures the holder to an automotive vehicle rack. In this connection, means provided as part of the holder for securing the cradle to a bar of the automotive rack interacts with means for securing a mast or other object in a cradle rest of such holder, to provide the desired reliable securance of the object to the rack without providing securance tensile stress on the cradle. The cradle is also designed to be sufficiently pliable to conform generally to the exterior shape of the mast or other object expected to be encountered by the same.

The material for the object rest of the cradle not only is selected to be sufficiently pliable to conform generally to the exterior shape of a mast or other object expected to be carried by the same, the holder includes support structure for the rest which reinforces the latter. In one embodiment, the interaction mentioned above is most simply provided by straps as will be discussed in more detail below. In another embodiment it is the interaction of the structural shape of the cradle of the holder with that of the support structure which provides the securance in a manner which will not provide securance tensile stress on the cradle.

Most desirably, the cradle and support structure are of two different material hardnesses. They actually can be of two different materials. In one embodiment, the cradle is coextruded from two materials, one for the object rest selected to provide the desired pliability and the other of which is selected to provide the rest support structure.

Other features and advantages of the invention either will become apparent or will be described in connection with the following, more detailed description of a preferred embodiment of the invention.

BRIEF DESCRIPTION OF THE DRAWING

With reference to the accompanying drawing:

FIG. 1 is a schematic and partial isometric view of an automotive vehicle having a roof rack to which a pair of holders incorporating a preferred embodiment of the invention are secured;

FIG. 2 is an isometric view of the holder illustrated in FIG. 1, showing its interrelationship with a rack crossbar;

FIG. 3 is another isometric view illustrating the manner in which the straps of the holder interact;

FIG. 4 is a side elevational view illustrating the configuration of the cradle;

FIG. 5 is a view similar to FIG. 4 showing a coextruded embodiment of the invention;

DETAILED DESCRIPTION OF THE PREFERRED EMBODIMENTS

Figure 6:
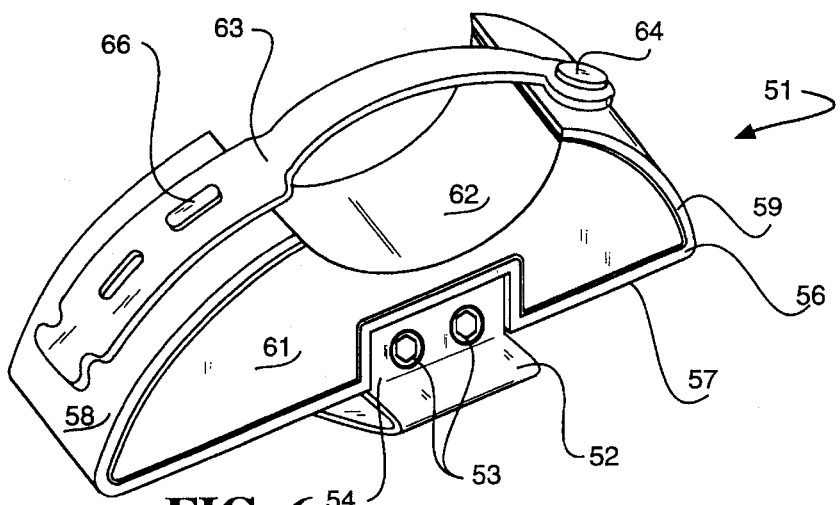
FIG. 6 is an isometric view of another preferred embodiment of the invention.

The following relatively detailed description is provided to satisfy the patent statutes. However, it will be appreciated by those skilled in the art that various changes and modifications can be made without departing from the invention.

An automotive rack is illustrated in FIG. 1 on a roof panel 11 of a vehicle. The rack includes a pair of spaced apart side rails 12 and 13 between which cross bars 14 and 16 extend. In this connection, such cross bars are spaced above the panel 11 by stanchions 17. Such stanchions may be slidable or have fixed positions along the length of the side rails as is common. A plurality of slats 18 are also provided as part of the rack, to protect the surface of the roof from cargo and to distribute its cargo load.

A pair of holders incorporating the invention are generally referred to at 21 and 22. These holders conform to the embodiment of the invention illustrated in FIGS. 2 through 5. It will be appreciated, though, that the embodiment of FIGS. 6 through 8 or any other embodiment of the invention could be shown in FIG. 1.

Holders 21 and 22 are identical, and only holder 21 will be described in detail. It includes a cradle 23 to be discussed in more detail hereinafter, and means in the form of a strap 24 for securing an object in a rest 26 of the holder. A pair of separate straps 27 and 28 act as components of a securing means for securing the cradle 23 to the bar 16.

The three straps 24, 27 and 28 interact with one another to provide reliable securance of a mast or other elongated object represented at 29. That is, the strap 24 which holds the object in the rest 26 of the cradle, passes through the straps 27 and 28. This strap interaction is most easily seen from FIG. 3 in which the cradle is schematically illustrated by a phantom line drawing. It will be recognized that there is no reliance on the cradle itself to actually provide the securance to the cross bar. The strap interaction provides reliable securance of the mast to the bar without providing securance tensile stress to the cradle. It also will be seen that the straps 27 and 28 do not deform the rest 26. It is therefore not necessary that the cradle be of a material capable of providing the reliable securance. Moreover, it is to be noted that the straps are at the opposite sides of the rest.

Rest 26 of the cradle is made of a material selected to be sufficiently pliable to conform generally to the exterior shape of a mast or other object expected to be carried thereby. In this particular embodiment the configuration of the rest for this purpose is hemispherical and the material is sufficiently pliable that it mates with the exterior surface of the mast.

Flexible strap 24 aids in assuring that the cradle rest conforms to the shape of the mast. As can be seen from FIGS. 2 and 3, such strap tends to squeeze the rest about the object, in view of its engagement with the side walls 31 and 32 of the cradle structure. That is, it provides such aid by urging the rest 26 toward the object being supported.

It will be seen that the positioning of the straps 27 and 28 spreads out the base of the strap 24 and facilitates such engagement. It will also be seen that the straps 27 and 28 provide the reliable securance to the cross bar 16 which is necessary without deforming the shape of the cradle rest 26.

The cradle 23 provides support for the mast or other object but, as previously mentioned, is not relied upon itself to provide securance to the rack cross bar. FIG. 4 illustrates the structure of such cradle. It includes not only the rest 26, but a support structure for such rest made up of the curvilinear walls 31 and 32, a straight base 33, and a pair of curvilinear trusses 34 and 36 which extend from the base to the rest. It also includes a pair of walls 37 and 38 which are parallel to the base 33 and define slots 39 and 41 for the straps 27 and 28. The material of the support structure for the rest is selected to have the structural strength required to provide the desired support for the rest 26. Selection of such material is well within the skill of the art.

The cradle of this embodiment most simply is made from two materials by coextrusion. Such a coextruded cradle is represented by FIG. 5. The material of the rest is shown cross hatched, whereas the material of the support structure is not cross hatched to distinguish the same.

As mentioned previously, the rack holders 21 and 22 are identical. They are spaced from one another by the rack cross bars 14 and 16 to hold the mast at separated points.

Figure 7:
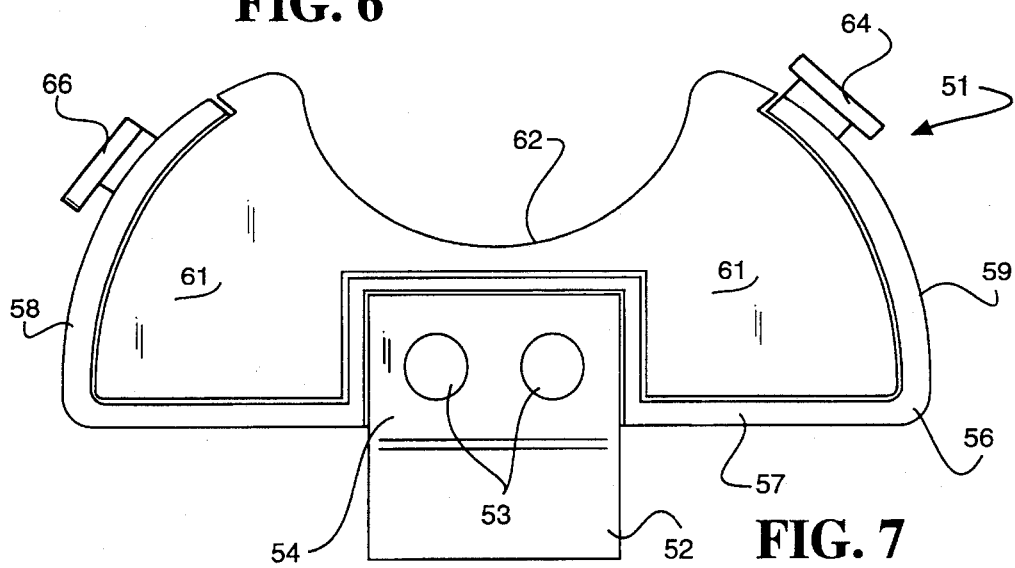
FIG. 7 is a side view of the preferred embodiment of FIG. 6.
Figure 8:
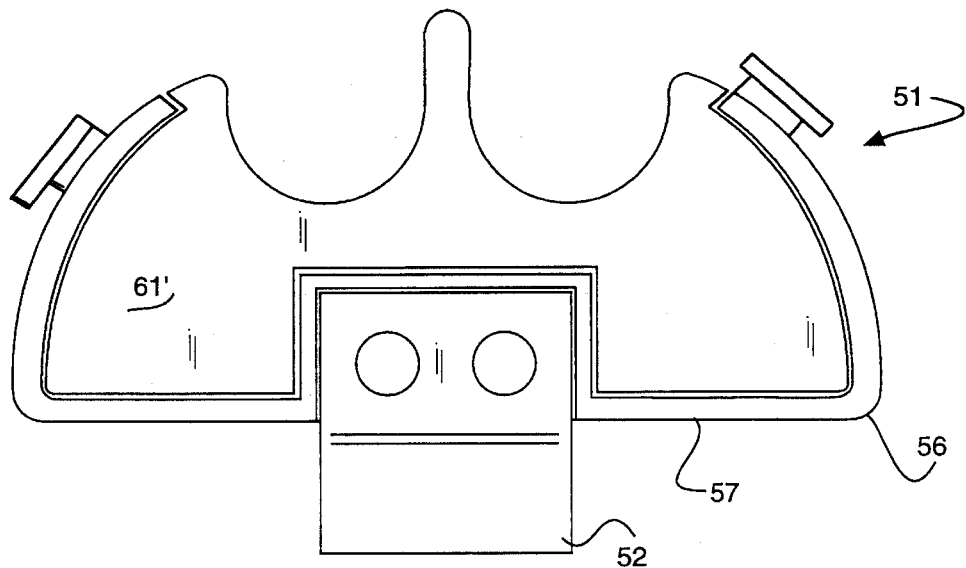
FIG. 8 illustrates a modification of the preferred embodiment of FIG. 6.

Another preferred embodiment of the holder of the invention is illustrated in FIGS. 6 through 8. In this embodiment, the support structure for securing the holder to a rack cross bar is completely separate from the cradle having the object rest for a mast. Such holder is generally referred to by the reference numeral 51. The support structure includes a clip 52 of a known design which can engageably surround a rack cross bar. The clip is held in position on the bar by a pair of bolts 53 which pass through registering holes in end flanges, one of which is shown, end flange 54.

The clip 52 holds between its two opposed end flanges, a dependent flange (not shown) of holder support structure 56. In this connection, bolts 53 pass through such dependent flange. Support structure 56 includes not only a straight base 57 designed to follow a rack cross bar, but upstanding curvilinear-end walls 58 and 59. Such end walls converge toward one another and cooperate with the base 57 to capture a cradle 61 of the holder. Such cradle is of a soft material, such as a plastic foam, and defines an object rest having a cylindrical surface 62 configured to conform to the external shape of an object expected to be supported thereby. A flexible strap 63 of rubber or the like extends between pins 64 and 66 to capture the object to be carried within the object rest.

As best seen in FIG. 7, the object rest most desirably fits within side cavities provided on the cradle. This structure, though, is optional and it will be seen from FIG. 6 how it is preferred the support structure interact with the cradle when side cavities are not provided. In this connection, it will be recognized that it is the structure of the cradle which determines if such cavities are available and, as will be discussed in more detail below, one of the features of this invention is that differing cradle designs can be used with the single support structure design.

Since the end walls 58 and 59 converge toward one another and are held by a flexible strap 63 about the object being carried, such end walls will "squeeze" the cradle and force the rest to mate with the exterior shape of the mast or other object at the location of the cradle.

It is preferred that there be interacting structural parts between the support structure and the cradle to prevent the latter from moving axially of the object being carried, out of the support structure. For example, although not shown, interior ribs can be provided on the straight wall 57 to interact with registering slots in the cradle.

The object support is most desirably relatively hard, made of, for example, nylon. It has a hardness density in the range of between 70–90 durometers, Shore A. In an implementation of the invention it was found that a durometer of 75 was ideal. The cradle is a cellular elastomeric foam being, for example, an insert of durometer hardness within the range of about 20–50 Shore A. In the implementation discussed above the cradle was elastomeric urethane foam having a durometer value of 30, Shore A.

As mentioned previously, one of the features of this embodiment is that the support structure and the cradle are completely separate members. This means that the cradle can be considered to be an insert for a standard support structure frame, which insert is especially designed for an object to be carried. FIG. 8 illustrates a modification of the invention as an example. The cradle 61' of such embodiment is configured to support two masts rather than a single one. In all other respects, the arrangement shown in FIG. 8 is the same as the arrangement shown in FIGS. 6 and 7 and the same reference numerals are used.

As mentioned at the beginning of the detailed description, applicant is not limited to the specific embodiments described above. Various changes and modifications can be made. The claims, their equivalents and their equivalent language define the scope of protection.

What is claimed is:

1. A holder for reliably securing an elongated object to an automotive vehicle rack, comprising:

(a) a cradle having a material defining an object rest selected to be sufficiently pliable to conform generally to the exterior shape of an object expected to be carried thereby, said cradle including a support structure at least partially surrounding said material, said support structure having ends on opposite sides of said object rest;

(b) a first flexible strap for securing an object in said rest, said first strap having a first end attached to one of said ends of said support structure and a second end attached to an opposite end to said support structure whereby said strap squeezes said support structure to conform said material to the shape of an object secured therein; and (c) means for securing said cradle to a bar of said automotive vehicle rack.

2. The holder of claim 1 wherein the configuration of said rest and its material are selected to be sufficiently pliable to mate its exterior surface generally with the expected object exterior shape.

3. The holder of claim 1 wherein said material has a durometer, Shore A in the range of between about 20 and 50.

4. The holder of claim 3 wherein the material of said object rest has a durometer, Shore A value of about 30.

5. The holder of claim 1 wherein said flexible strap is selected to aid in the conformation of said rest to said object exterior shape.

6. The holder of claim 5 wherein said flexible strap which both secures said object in said rest and urges said rest toward said object.

7. The holder of claim 1 wherein said means for securing said cradle to a bar of said automotive vehicle rack is positioned to provide said securance without deforming the shape of said rest.

8. The holder of claim 7 wherein said means for securing said cradle to a bar of said automotive vehicle is a clip which engagedly surrounds said bar.

9. The holder of claim 1 wherein said support structure is configured to interact with said rest to provide structural support for the same.

10. The holder of claim 9 wherein said support structure has a durometer, Shore A value in the range of between about 70 and 90.

11. The holder of claim 9 wherein said material of said support has a durometer, Shore A value of about 75.

12. A holder for reliably securing an object to an automotive vehicle rack, comprising:
  (a) a cradle having an object rest configured generally to conform to the exterior shape of an object expected to be carried thereby, said cradle including a support structure at least partially surrounding said material, said support structure having ends on opposite sides of said object rest;
  (b) a flexible strap for securing an object in said rest, said strap having a first end attached to one of said ends of said support structure and a second end attached to an opposite end of said support structure whereby said strap squeezes said support structure to conform said material to the shape of an object secured therein; and
  (c) means for securing said cradle to a bar of said automotive rack.

13. The holder of claim 12 wherein said means for securing said cradle to a bar of said automotive rack includes a clip which engagedly surrounds an associated rack bar.

14. The holder of claim 12 wherein said object rest is of a material selected to be sufficiently pliable to conform generally to the exterior shape of an object expected to be carried thereby.

15. A holder for reliably securing an object to an automotive vehicle rack, comprising:
  (a) a cradle of a material at an object rest thereof selected to be sufficiently pliable to mate generally with the exterior shape of an object expected to be carried thereby, said cradle further including a support structure configured to interact with said rest to provide structural support for the same, said support structure at least partially surrounding said material, said support structure having ends on opposite sides of said object rest;
  (b) a first flexible strap for securing an object in said rest, said strap having a first end attached to one of said ends of said support structure and a second end attached to an opposite end of said support structure whereby said strap squeezes said support structure to conform to the shape of an object secured therein; and
  (c) means for securing said cradle to a bar of said automotive vehicle rack without deforming the shape of said rest.

16. The holder of claim 15 wherein said means for securing said cradle to a bar of said automotive vehicle rack includes a clip which engagedly surrounds an associated rack bar.

17. A holder for reliably securing an object to an automotive vehicle rack, comprising:
  (a) a cradle having an object rest configured to conform generally to the exterior shape of an object expected to be carried thereby, said cradle including a support structure at least partially surrounding said material, said support structure having ends on opposite sides of said object rest;
  (b) a flexible strap for securing an object in said rest, said strap having a first end attached to one of said ends of said support structure and a second end attached to an opposite end of said support structure whereby said strap squeezes said support structure to conform to the shape of an object secured therein; and
  (c) means for securing said cradle to a bar of said automotive rack and for interacting with said flexible strap for securing an object in said rest to provide reliable securance of said object to said rack without providing securance tensile stress on said cradle.

* * * * *